United States Patent [19]
Kilmer

[11] 3,746,120
[45] July 17, 1973

[54] GAS EXPLODER APPARATUS WITH SUCTION RELEASE

[75] Inventor: Lauren G. Kilmer, Tulsa, Okla.

[73] Assignee: Atlantic Richfield Company, Dallas, Tex.

[22] Filed: Sept. 9, 1968

[21] Appl. No.: 758,199

[52] U.S. Cl. .............................. 181/.5 NC
[51] Int. Cl. .......................... G01v 1/06, G01v 1/14
[58] Field of Search ..................... 181/.5 XC, .5 NC

[56] References Cited
UNITED STATES PATENTS

| | | | |
|---|---|---|---|
| 3,260,327 | 7/1966 | McCollum | 181/.5 |
| 3,365,019 | 1/1968 | Bays | 181/.5 |
| 3,401,770 | 9/1968 | Kilmer et al. | 181/.5 |

Primary Examiner—Benjamin A. Borchelt
Assistant Examiner—N. Moskowitz
Attorney—John W. Behringer, Eugene L. Bernard, Martin J. Brown, James N. Dresser, W. Brown Morton, Jr., John T. Roberts, Malcolm L. Sutherland, Blucker S. Thorp, Roderick W. MacDonald, M. David Folzenlogen and Richard A. Bachand

[57] ABSTRACT

A seismic prospecting device comprising a gas exploder including an expansible explosion chamber having a rigid top and a rigid bottom connected together by an extensible sidewall, resilient fastening means for attaching the top and bottom together and for normally biasing the top and bottom together, resilient sealing means inside of the joint formed between the top and bottom, gas charging and ignition means for the chamber, exhaust means for the chamber, and releasing means including a molded jacket which is fitted to the bottom of the exploder, allowing the exploder to be released from the suction of a soft land or semi-liquid medium.

7 Claims, 1 Drawing Figure

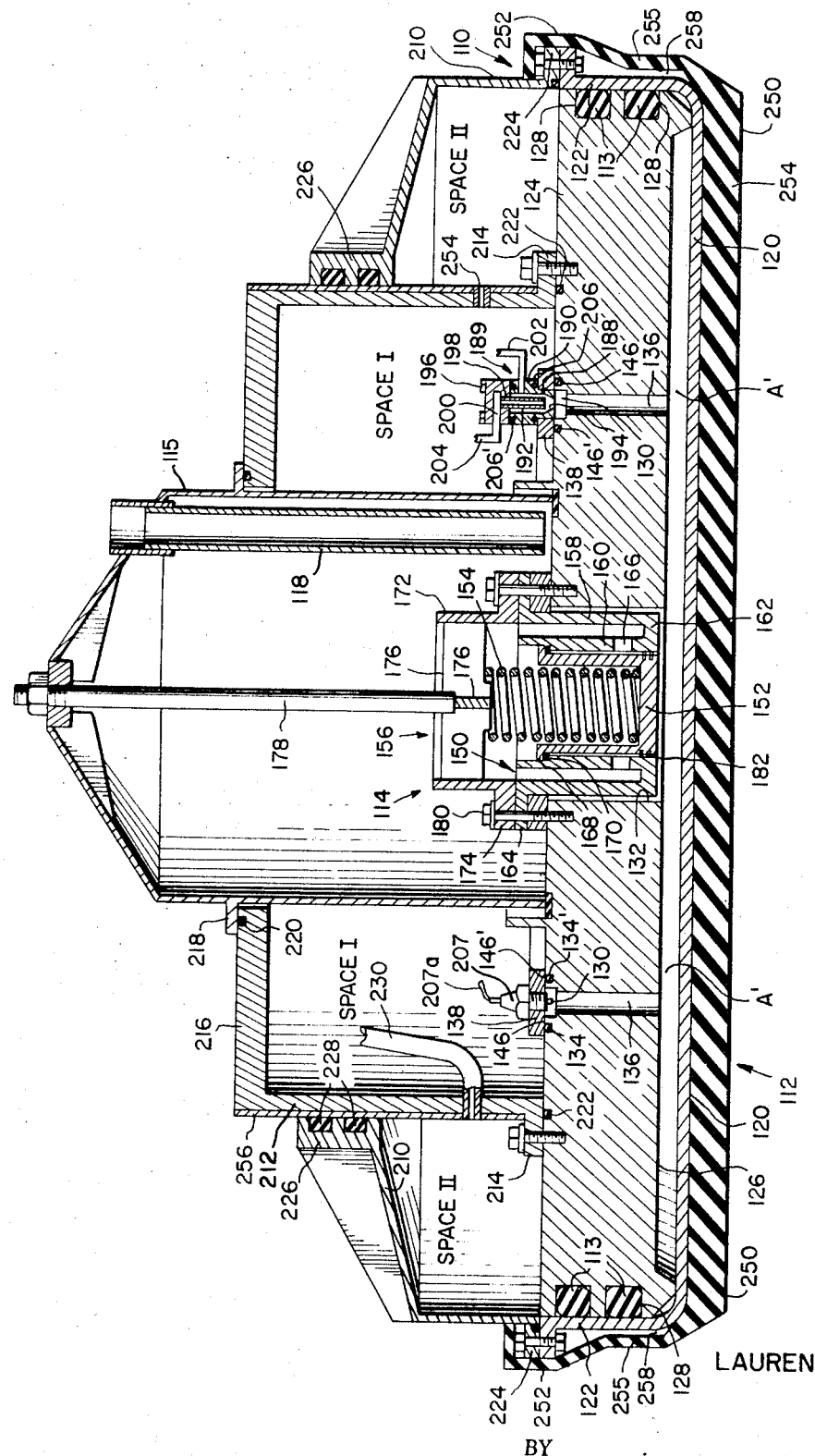

GAS EXPLODER APPARATUS WITH SUCTION RELEASE

This invention relates to seismic prospecting and the generation of seismic waves by gas exploders. More particularly, this invention pertains to a device which allows the gas exploder to be depressed onto a surface such as mud or wet vegetation and released therefrom without the additional load presented by atmosphere pressure due to suction on that part of the exploder located beneath the semi-liquid surface.

In many devices for producing a seismic wave for geophysical prospecting heretofore devised it has been the practice to employ a quantity of explosive material such as dynamite which is fired beneath the surface of the earth in predetermined spaced relation with respect to the seismic spread. Such devices possess several disadvantages, such as the necessity for replacement of the explosive cartridge after each shot and the problems incident to establishing a firing circuit to each of the cartridges in successive order whenever another cartridge is to be fired. Such an arrangement is costly in operation, particularly when a larger number of shots are to be fired. Furthermore, when the explosive shot emanates from a point source, as is the case with the explosive cartridge arrangement, the efficiency of the generated wave is low for the reason that the rate of change of pressure and the duration of the pressure peak do not correspond to the frequency most favorable to seismic wave propagation. It has been found necessary in the use of these prior devices to employ relatively large quantities of explosives to effect deep penetration of the seismic wave within the geological formation by reason of the undesired frequencies and inefficient character of the wave thus produced.

As described in copending U.S. Patent applications Ser. No. 613,792, filed Feb. 3, 1967, now U.S. Pat. No. 3,401,771 and Ser. No. 544,442, filed Apr. 22, 1966, now U.S. Pat. No. 3,401,769 a gas explosion confined in an expansible chamber acting at the earth-air interface against a large mass positioned above such gas explosion can be utilized to impart a compressive impulse to the surface of the earth beneath the gas explosion, thereby initiating a seismic wave. If the explosion is confined in a device having a rigid top carrying the weight of the large mass and rigid bottom with vertically extensible sidewalls, the seismic wave generated is useful for seismic prospecting by refraction and reflection techniques, since the impulse imparted to the surface of the earth has a high energy content and can be made of extremely short duration.

As areas of the earth have been explored for oil bearing formations, efforts have been made to apply the dry land techniques of seismic surveying to operations in soft land regions covered by a semi-liquid surface such as mud or wet vegetation. These dry land techniques have not been successfully adapted to such semi-liquid operations, however, due to the lack of a solid base upon which the device can rest. The weight of the seismic surveying apparatus generally causes it to sink a foot or more below the semi-liquid surface. When it is desired to move the seismic sound generator the suction caused by the semi-liquid surface adhering to the lower surface of the apparatus greatly increases the amount of pull which must be exerted to raise the apparatus. Since the area in which such operations are conducted is not readily accessible overland, helicopters are often used to transport the seismic prospecting apparatus. While a helicopter is capable of lifting the apparatus, the additional force due to the suction in the semi-liquid surface frequently makes it impossible for the helicopter to lift the apparatus.

The present invention is a gas exploder type seismic signal generator suitable for use on a semi-liquid surface and including means for aiding the removal of the signal generator from that semi-liquid surface without undue difficulty despite the suction which otherwise would tend to hinder removal of the apparatus. The gas exploder type signal generator of the present invention comprises a rigid top and a rigid bottom which, when at rest, are so constructed as to form between them a chamber in which a gas explosion can take place. The top and bottom are joined together by an extensible sidewall such that relative vertical movement can take place between them. The bottom is attached to the top with a resilient fastening or spring means which limit the relative vertical separating movement between the top and bottom and bias the bottom toward the top, so that the volume of the chamber is generally maintained in its original size. Internally of the gas exploder a dynamic seal is provided positioned on the inner side of and adjacent to the clearances at the joint between the top and bottom of the gas exploder. Also, in order that the resilient fastening or spring means which biases the top and bottom of the exploder together be not overly strained, a valving arrangement is employed to release the force of the exploded gas simultaneously as relative movement between the top and bottom of the exploder occurs. This is also desirable particularly where several explosions are required at a given location.

A molded polyurethane jacket is provided which fits around the exploder and is so disposed as to allow air to rush underneath the exploder as the exploder is lifted, releasing the suction pressure and allowing the device to be easily withdrawn.

For a more complete understanding of the practical application of this invention, reference is made to the appended drawing which is a vertical section of a gas exploder with attached molded jacket in accordance with this invention.

As illustrated in the drawing, the exploder in accordance with this invention basically includes a top 110, a bottom 112, sealing rings 113, an exhaust valve 114, and an exhaust stack 115. Top 110 includes an annular, thick steel plate 124 having an outside diameter slightly smaller than the inside diameter of the flange 122 on bottom 112 and is further provided with a depressed portion 126 in the bottom thereof as well as grooves 128 in the side thereof which contain sealing rings 113. The depressed portion 126 of plate 124 cooperates with bottom plate 120 of bottom 112 to form the detonation chamber A' of the exploder. Plate 124 also has an annular groove 130 in its upper surface between its outer rim and a central opening 132. Two smaller annular grooves 134 and 134' can be arranged, if desired, in plate 124 on opposite sides of groove 130 for O-rings 146 and 146', respectively, which seal groove 130. Groove 130 is connected to the chamber A' by two small, vertical openings 136 disposed at substantially 180° relative to each other about central opening 132. Plate 124 carries substantially coaxially positioned, generally annular upper ring 138 which is attached to the top side of plate 124 and covers groove 130 to form therewith an annular passage.

Valve 114 includes a valve body 150, a piston or valve element 152, a helical spring 154 and a spring retainer cage 156. Generally, valve body 150 includes a pair of coaxial cylindrical walls 158 and 160, which are spaced from each other, are closed together at their lower ends by means of an interconnecting annular end wall 162 and are open at their upper ends. The outer sidewall 158 and its upper end is provided with an outwardly extending annular flange 164 and itself has a diameter just less than that of opening 132 such that valve body 150 can be positioned in opening 132 with flange 164 overlying the top of plate 124. Inner wall 160 has a machined inside surface which is countersunk at its upper end and which is provided with a series of apertures 166 adjacent its lower end providing communication between the annular space between walls 158 and 160 and the central opening of valve body 150 lying inside wall 160. Piston 152 which is a machined casting sized to fit snugly but slidingly within cylindrical wall 160 has a flange 168 at its upper end received in the counter bore in the upper end of the interior of wall 160 to limit downward movement of piston 152 at a position in which the lower, closed end seals openings 166 in wall 160. An O-ring 170 cushions flange 168 at the counter bore surface. Piston rings 182 seal the piston 152 at its lower end.

Spring cage 156 includes a short steel cylinder 172 which has a pair of intersecting steel cross-plates 176 in its upper interior portion forming a spider to which is secured a cylindrical rod element 178. The cylinder portion 172 of spring cage 156 is positioned above valve body 150 with flange 174 overlying flange 164, and spring cage 156 and valve body 150 are retained in such position by a series of cap bolts 180 received in apertures in flanges 164 and 174 which register with correspondingly disposed tapped bores arranged about opening 132 in plate 124 such that helical spring 154 is retained snugly under compression between the underside of spider 176 and the upperside of the closed bottom of piston 152. The spacing of the flights of spring 154 in this position and the length of piston 152 in relation to the location of spider 176 is such that when piston 152 is displaced upwardly to the maximum compression of spring 154, apertures 166 in sidewall 160 are completely exposed to connect the chamber A' with the annular space between walls 158 and 160 of valve body 150 and hence with the exterior of the exploder through spring cage 156 and exhaust pipe 118. Pipe 118 can be connected through muffler 115 to provide low-pass characteristics desirably having an upper cut-off frequency on the order of five cycles per second.

The gas charging system basically includes a mixing valve 189 interconnected to groove 130. The mixing valve comprises a member 190 inserted into aperture 188 in ring 138. Member 190 has a central passage 192 and a tapered conical opening 194 which faces groove 130. A top valve member 196 carries a depending tube 198 which is inserted into passage 192 and opening 194 so that the spacing of the passage through opening 192 is controlled by the location of tube 198. A passage 200 extends through tube 198 and member 196. Separate connections 202 and 204, preferably valved, leading to storage cylinders respectively for propylene, or other suitable fuel gas, and oxygen are connected, respectively, to passages 192 and 200. Two O-rings 206 and 206' seal member 190 to ring 138 and member 196, respectively. The ignition system includes spark plugs, such as spark plug 207, arranged in apertures in ring 138 on either side of the mixing valve to extend through ring 138 and communicate with groove 130. Exteriorly the spark plugs thus mounted are electrically connected via leads, such as lead 207a, to a suitable electrical supply (not shown). It is also apparent that other types of gas manifolds, ignition systems, and valves can be used, if desired.

An air cushion formed between upwardly extending members 210 and 212 resiliently fastens bottom 112 to top 110. Member 212 is bolted to top member 124 at flange 214 and includes an upper flange 216 which engages flange 218 on muffler 115. Flange 216 is sealed at flange 218 by O-rings 220, and flange 214 is sealed at top member 124 by O-ring 222 to form between member 212 and muffler 115 an air space I. Member 210 is bolted at flange 224 to the flange 122 of bottom 112. Member 210 extends upwardly and inwardly toward member 212 to slidingly engage member 212. Member 210 engages member 212 at an enlarged portion 226 and is sealed thereat by O-rings 228 to form an air space II. Member 212 can be sheathed in a metal 256, e.g. monel metal, for protection against sea water, if desired. Space II is normally filled with air under pressure, e.g. about 15 to 20 p.s.i.g. by means of a hose 230 which extends through the flange 216 (not shown). The air pressure in space II bleeds through bleed valve 254 at a reduced rate from space II into space I which, accordingly, serves as a plenum chamber for the air filled spring. Space I is used to house the various hose connections 202 and 204 for the gas charging system, the mixing valve, and the ignition spark plugs 207, hose 230, etc., and the pressure in space I serves to keep water out.

A molded jacket 254 is attached to bottom plate 120 through the use of a molded attachment ring 252. Jacket 254 is formed of a resilient high strength material such as polyurethane. The jacket has a thickness on its bottom 250 in the order of about 1 inch to permit it to enfold stones, stumps, or other protrusions located on the ground without shearing. The sidewall 255 of jacket 254 is thinner than bottom 257, having a thickness in the order of three-sixteenths of an inch to permit the sidewall to extend or stretch.

In operation the gas exploder is located at a suitable location with the bottom of the molded jacket 250 resting on the surface of a body of soft land or semi-liquid medium such as that encountered in swamp regions, e.g. up to 1 foot or more. Typically the force of spring 154 is sufficient such that operation of piston 152 does not occur until a pressure within exploder chamber A' on the order of 30 p.s.i.g. has been reached. Conduits 202 and 204 introduce propylene and oxygen until a pressure in exploder Chamber A' on the order of 2 p.s.i.g. has been achieved. It will be apparent that a stoichiometric mixture of oxygen and propylene is sought and that this is achieved quite simply by introducing the gases such that the partial pressures of each are in proportion to the molar ratio of a stoichiometric mixture, i.e., $4.5:1::O_2:C_3H_6$. The mixing valve 189 insures adequate mixing of the gases. The pressure in space II is adjusted by introducing air through conduit 230 to provide a pressure sufficient to hold the bottom 120 and top 110 together and return them after an explosion. Spark plug 207 is energized to detonate the gas mixture in chamber A'. Upon explosion of the gases, the initial force of the explosion is directed against bottom 120 due to the larger mass of top 110 to create the seismic wave of interest. The continued expansion of the exploding gases drives the bottom 120 downwardly relative to top 110, since bottom 120 is relatively considerably lighter than top 110, tending to compress the air spring formed by space II. At such time the pressure of the exploding gases forces sealing ring 113 tightly against the joint formed between the flange 122 and top body 124, generally deforming ring 113 against such joint. At the same time as relative movement of the bottom 120 and top 110 occurs, however, piston 152 is lifted at an even faster rate to vent chamber A' through valve 114 and muffler 115. This venting action is so rapid that normally the pressure is relieved within a fraction of a second, and generally after such venting, the pressure of unvented combustion gases remaining between top 110 and bottom 120 is substantially negative to atmospheric, being on the order of 5 p.s.i.a. As a result, it is usually unnecessary in subsequent firing to purge the interior of the gas exploder when recharging, and recharging can be so fast that repetitive firing at significantly rapid rates is feasible. After an explosion, top 110 and bottom 120 are biased toward their closed position by the air pressure within space II as well as the forces applied by the weight of top 110. Closure of valve 114 through the action of spring 154 is timed to provide for exhaust of chamber A'.

When removing the exploder from the soft earth or semi-liquid medium, the exploder is lifted slowly by a helicopter or other suitable means. Due to suction in the semi-liquid medium, the bottom 257 of the jacket 250 remains in contact with the ground. Because the molded jacket 250 covering the lower part of the exploder is thinner at the side walls 255 than at the bottom, the walls stretch and become extended as the exploder is lifted. The bottom plate 120 of the exploder rises as the exploder is lifted, thus enlarging the space 258 between jacket 250 and bottom plate 120. This enlarged space 258 soon extends between bottom plate 120 and jacket bottom 257. As the space 258 enlarges, the air therein expands. The expansion of this air reduces the pressure between jacket 250 and bottom plate 120, and the jacket then becomes deformed due to outside pressure. As the jacket deforms, a space is created between the jacket and the semi-liquid medium, allowing air to rush in from the atmosphere and thereby breaking the suction and releasing the jacket from the semi-liquid medium. The exploder can then be readily lifted.

Although the present invention has been described with reference to a preferred embodiment, numerous modifications and rearrangements could be made, and still the resulting apparatus would fall within the scope of the invention.

What is claimed is:

1. In an apparatus for propagating a seismic wave at the surface of the earth by the explosion of a combustible mixture in a chamber having a rigid bottom and a rigid top resiliently fastened together to permit limited vertical movement therebetween, the improvement of resilient releasing means on said bottom for forming an expansible air space between said releasing means and said rigid bottom as the apparatus is removed from a semi-liquid surface.

2. Apparatus as claimed in claim 1 in which said releasing means comprises a resilient jacket attached to said rigid bottom and extending beneath said rigid bottom, said rigid bottom moving to enlarge the air space during vertical movement as the apparatus is removed from a semi-liquid surface.

3. Apparatus as claimed in claim 2 in which said resilient jacket is formed of polyurethane.

4. Apparatus for propagating a seismic wave including means defining a closed chamber having a rigid bottom and rigid top including at least a portion telescoping into said bottom and forming a joint between said top and bottom at their sides having clearances therebetween; a resilient sealing ring disposed between said top and bottom on the inner side of said joint positioned against the clearances thereof to seal said chamber; fastening means for attaching said bottom to said top and permitting vertical movement between said bottom and said top including means for limiting said movement; means for charging said chamber with an explosive gas; means for igniting said explosive gas within said chamber; means for exhausting said chamber; and resilient releasing means attached to said rigid bottom for forming an expansible air space between said releasing means and said rigid bottom as the apparatus is removed from a semi-liquid surface.

5. Apparatus as claimed in claim 4 in which said releasing means comprises a resilient jacket attached to said rigid bottom, said rigid bottom moving to enlarge the air space during vertical movement as the apparatus is removed from a semi-liquid surface.

6. Apparatus as claimed in claim 5 in which said resilient jacket is formed of polyurethane.

7. Apparatus for propagating a seismic wave including means defining a closed chamber having a rigid bottom and rigid top including at least a portion telescoping into said bottom and forming a joint between said top and bottom at their sides having clearances therebetween; a resilient sealing ring disposed between said top and bottom on the inner side of said joint positioned against the clearances thereof to seal said chamber; a first annular member secured to said bottom outwardly of the top and extending above the top; a second annular member secured to and extending above said top; said first and second annular members being arranged to slidingly and sealingly engage each other above said top and to form therebetween an air cushion; means for supplying air to said air cushion; resilient releasing means secured to the junction of the bottom and the first annular member and extending downwardly alongside and under the bottom to define an extensible air space, said bottom moving to enlarge said air space during vertical movement of the apparatus is removed from a semi-liquid medium, gas charging means including conduit means providing external communication to said chamber adapted to provide a combustible mixture in said chamber, ignition means for the combustible mixture, and exhaust means including means defining an opening in said top adapted to provide external communication from the atmosphere to said chamber and normally closed valve means positioned in said opening to close said communication therethrough and operable upon a predetermined increase in pressure in said chamber to open thereby communicating said chamber with the exterior of said device.

* * * * *